United States Patent Office 3,367,971
Patented Feb. 6, 1968

3,367,971
PREPARATION OF PERFLUOROISOPROPYL SULFIDE AND PERFLUOROACETONE
Norman L. Madison, Midland, Mich., assignor to The Dow Chemical Company, Midland, Mich., a corporation of Delaware
No Drawing. Filed Feb. 21, 1966, Ser. No. 528,813
7 Claims. (Cl. 260—593)

This invention relates to the preparation of perfluoroalkyl compounds and more particularly is concerned with a novel process for simultaneously preparing perfluoroisopropyl sulfide $$[(F_3C)_2-\underset{F}{C}-S-\underset{F}{C}-(CF_3)_2]$$

and perfluoroacetone $$(F_3C-\underset{\|}{\overset{O}{C}}-CF_3)$$

It is a principal object of the present invention to provide a novel process for the preparation of perfluoroisopropyl sulfide using relatively inexpensive thionyl fluoride as a reactant wherein simultaneously there is co-produced the useful compound perfluoroacetone.

This and other objects and advantages readily will become apparent from the detailed description presented hereinafter.

In accordance with the present novel process perfluoropropene $$(F_3C-\underset{F}{C}=CF_2)$$

and thionyl fluoride (SOF$_2$) in an inert carrier which at least partially dissolves the reactants are reacted for a period of from about 12 to about 120 hours or more at a temperature of from about 50° C. to about 150° C. in the presence of a weak base catalyst. The perfluoroisopropyl sulfide and perfluoroacetone products are recovered from the reaction mass.

Ordinarily, in the practice of the present invention, a solution of perfluoropropene and thionyl fluoride at $$F_3C-\underset{F}{C}=CF_2/SOF_2$$

gram mole proportions of from about 1/1 to about 5/1 or more, preferably about 3/1, is prepared. The reactants are maintained within the temperature range set forth hereinbefore and preferably at from about 75° C. to about 150° C. a period of from about 4 to about 60 hours in a sealed reactor under the vapor pressure of the reactant mixture. A weak base material catalyst at a minimum of at least about 0.01 mole percent, ordinarily from about 0.01 to about 10 mole percent or more and preferably from about 0.01 to about 1 mole percent, based on the amount of thionyl fluoride reactant, is incorporated into the reaction mass.

The quantity of solvent to be employed at minimum must be that which gives partial solubility to the reactants. Ordinarily, the amount of solvent employed ranges from about 5 to about 100 percent on a weight basis based on the total weight of perfluoropropene and thionyl fluoride. This range is not critical, however, since larger or smaller amounts of solvent can be employed.

The resulting perfluoroisopropyl sulfide and perfluoroacetone products readily are separated and recovered from the product mixture by fractional distillation, chromatographic techniques and the like separatory and recovery procedures as are known to one skilled in the art.

Catalyst materials suitable for use in the present process are alkali metal fluorides, e.g. cesium fluoride or rubidium fluoride, alkali metal acetates, e.g. sodium acetate or potassium acetate, alkaline earth metal carbonates, pyridine, quaternary ammonium salts, tertiary alkyl amines, alkali metal cyanides and the like. Cesium fluoride has been found to be particularly effective.

Solvents, i.e. carriers, operable in the present process are dipolar aprotic materials including, for example, acetonitrile, dimethyl formamide, benzonitrile, dimethyl sulfoxide, nitrobenzene, diethyleneglycol dimethyl ether and the like. Acetonitrile has been found to be particularly suitable.

The following example will serve further to illustrate the present invention but is not meant to limit it thereto.

Example

About 30 cubic centimeters (~23.5 grams) of acetonitrile, dried over phosphorus pentoxide, was distilled into a 125 cubic centimeter glass-tube reactor containing about 0.4 gram (~0.003 gram mole) of cesium fluoride. About 30 grams (~0.2 gram mole) of fluoropropene and about 40 grams (~0.6 gram mole) of thionyl fluoride also were condensed into the reactor. The reactor was sealed and its contents heated under autogeneous pressure at a temperature of about 120° C. for about 60 hours. After the reaction period, the rector was cooled, opened and the more volatile components, including perfluoroacetone product were removed by evaporation at a low temperature, i.e. about room temperature, under a low pressure and collected in a liquid nitrogen cooled trap. Perfluoroacetone product was recovered and identified from its properties and characteristics which were consistent with those known for this compound.

An oil-like product mass remained in the reactor. This was distilled and the perfluoroisopropyl sulfide product then purified by preparative vapor phase chromatography on fluorosiloxane and perfluorotributyl amine chromatographic columns.

The identity of the perfluoroisopropyl sulfide product was established from elemental chemical analysis, infrared spectrum and nuclear magnetic resonance spectrum. Elemental analysis for fluorine, carbon and sulfur gave: F, 71.2%, calc., 71.8%; C, 19.9%, calc., 19.5%; S, 8.7%, calc., 8.7%. The nuclear magnetic resonance spectrum was the same as that published by Rosenberg and Nuetterties, Inorg. Chem., 1, 756–762 (1952). The infrared spectrum was consistent with the compound structure.

In a manner similar to that described for the foregoing example, perfluoropropene and thionyl fluoride at $$CF_3C=\underset{F}{C}F_2/SOF_2$$

gram mole proportions of from about 1/1 to about 5/1 can be dissolved in an inert solvent of the type set forth hereinbefore and reacted in the presence of a weak base catalyst selected from those described in the present specification in accordance with the operating conditions set forth herein to prepare perfluoroisopropyl sulfide and perfluoroacetone.

Various modifications can be made in the process of the present invention without departing from the spirit or scope theerof for it is understood that I limit myself only as defined in the appended claims.

I claim:
1. A process for preparing perfluoroisopropyl sulfide and perfluoroacetone which comprises:
(a) preparing a solution of perfluoropropene and thionyl fluoride in an inert carrier which at least partially dissolves the reactants, the gram mole proportions of said perfluoropropene/thionyl fluoride in the reaction mixture ranging from about 1/1 to about 5/1,
(b) maintaining said reaction mixture in the presence of a weak base catalyst at a temperature of from about 50° C. to about 150° C. for a period of from about 12 to about 120 hours in a sealed reactor under the vapor pressure of the reaction mixture, and (c) separating and recovering perfluoroacetone and perfluoroisopropyl sulfide from said product mass.

2. The process as defined in claim 1 wherein the gram mole proportion of perfluoropropene/thionyl fluoride reactants is about 3/1.

3. The process as defined in claim 1 wherein the reaction is carried out at a temperature of from about 75 to about 150° C.

4. The process as defined in claim 1 wherein the weak base catalyst is a member selected from the group consisting of alkali metal fluorides, alkali metal acetates, alkaline earth metal carbonates, alkali metal carbonates, pyridine, quaternary ammonium salts, tertiary alkyl amines and alkali metal cyanides, said catalyst being present in an amount of at least about 0.01 mole percent based on the amount of thionyl fluoride.

5. The process as defined in claim 4 wherein the weak base catalyst is cesium fluoride, said catalyst being present in an amount of from about 0.01 to about 1 mole percent based on the amount of thionyl fluoride.

6. The process as defined in claim 1 wherein the inert carrier is acetonitrile.

7. The process as defined in claim 1 wherein the gram mole proportion of perfluoropropene/thionyl fluoride reactants is about 3/1, said reactants are dissolved in acetonitrile and reacted at a temperature of about 120° C. in the presence of cesium fluoride catalyst and including the steps of cooling the resultant product mass, separating and recovering the more volatile perfluoroacetone by low temperature, low pressure evaporation, and fractionating the residual oil-like product mass and recovering perfluoroisopropyl sulfide therefrom.

References Cited
UNITED STATES PATENTS 2,669,587   2/1954   Miller et al. _____ 260—609

LEON ZITVER, *Primary Examiner.*

M. JACOB, *Assistant Examiner.*